(12) United States Patent
Imai et al.

(10) Patent No.: US 6,426,935 B1
(45) Date of Patent: Jul. 30, 2002

(54) SUPPORTING STRUCTURE OF FLOATING CHASSIS OF DISC APPARATUS

(75) Inventors: Tsutomu Imai, Ohme; Yosuke Haga, Ohmiya; Takeharu Sasada, Hachiouji; Shinji Masuda, Hino; Atuomi Ono, Hachiouji; Midori Murakami, Kokubunji, all of (JP)

(73) Assignee: Kabushiki Kaisha Kenwood, Tokyo (JP)

( * ) Notice: Subject to any disclaimer, the term of this patent is extended or adjusted under 35 U.S.C. 154(b) by 0 days.

(21) Appl. No.: 09/485,868
(22) PCT Filed: Aug. 10, 1998
(86) PCT No.: PCT/JP98/03550
§ 371 (c)(1), (2), (4) Date: Feb. 18, 2000
(87) PCT Pub. No.: WO99/10889
PCT Pub. Date: Mar. 4, 1999

(30) Foreign Application Priority Data

Aug. 22, 1997 (JP) .............................................. 9-242152
Aug. 29, 1997 (JP) .............................................. 9-250070

(51) Int. Cl.⁷ .............................................. G11B 33/08
(52) U.S. Cl. .................................................... 369/263
(58) Field of Search ................................ 369/263, 246, 369/247, 248, 77.2, 75.1; 360/99.12; 267/34

(56) References Cited

U.S. PATENT DOCUMENTS 4,764,917 A    8/1988 Sugihara et al. ........... 369/77.1
4,794,588 A  * 12/1988 Yoshitoshi et al. ......... 369/263

(List continued on next page.)

FOREIGN PATENT DOCUMENTS

DE    33 18 788    11/1984
EP    0 347 812    12/1989

(List continued on next page.)

OTHER PUBLICATIONS

Patent Abstracts of Japan 06–208785, "Damper and Floating Mechanism" Jul. 26, 1994, Inventor: Ito Shinji.
Patent Abstracts of Japan 05–298801, "Disk Player"Nov. 12, 1993, Inventor: Tokita Keiji.
Patent Abstracts of Japan 58–057663, "Disk Loading Device" Apr. 5, 1983, Inventor: Sugi Masao.
Patent Abstracts of Japan 04–362563, "Recording/Reproducing Device" Dec. 15, 1992, Inventor: Arai Toshiyuki.
Patent Abstracts of Japan 63–037854, "Disk Driver" Feb. 18, 1988, Inventor: Okita Masao.
Patent Abstracts of Japan 07–230659, "Disk Player Device" Aug. 29, 1995, Inventor: Chigasaki Hiroyuki.
European Search Report, Application No. 01113287.5–2210 Nov. 15, 2001.
Patent Abstracts of Japan, Publication No. 04125336, Apr. 24, 1992, "Vibration Isolating Rubber for Mounted Compact Disk".
Patent Abstracts of Japan, Publication No. 06208785, Jul. 26, 1994, "Damper and Floating Mechanism ".
Patent Abstracts of Japan, Publication No. 02098863, Apr. 11, 1990, "Disk Player".

*Primary Examiner*—Brian E. Miller
*Assistant Examiner*—Tianjie Chen
(74) *Attorney, Agent, or Firm*—Eric J. Robinson; Robinson Intellectual Property Law Office (57) ABSTRACT

A floating chassis support mechanism is provided which can thin a disc reproduction apparatus. In the floating chassis support mechanism for a disc reproduction apparatus for supporting a floating chassis with springs and dampers vertically from the opposite side of a loaded disc, the damper is disposed outside of a projection area of the disc, and an area of the floating chassis supported by the dampers is retracted towards the disc side more than a lower surface of the disc.

12 Claims, 10 Drawing Sheets

U.S. PATENT DOCUMENTS

| | | | | |
|---|---|---|---|---|
| 4,922,478 A | * | 5/1990 | Verhagen | 369/247 |
| 5,142,522 A | | 8/1992 | Muramatsu et al. | 369/76.2 |
| 5,379,990 A | * | 1/1995 | Audo et al. | 267/34 |
| 5,737,304 A | * | 4/1998 | Soga et al. | 369/247 |
| 5,864,533 A | * | 1/1999 | Yamada et al. | 369/247 |
| 5,901,130 A | * | 5/1999 | Fukuyama et al. | 369/77.2 |
| 5,999,374 A | * | 12/1999 | Kim | 360/106 |
| 6,243,346 B1 | * | 6/2001 | Furukawa et al. | 369/75.1 |

FOREIGN PATENT DOCUMENTS

| | | | |
|---|---|---|---|
| EP | 0 439 853 | | 8/1991 |
| GB | 2 166 585 A | | 5/1996 |
| JP | 54-149820 | | 4/1978 |
| JP | 54-160001 | | 4/1978 |
| JP | 62-165040 | * | 7/1987 |
| JP | 63-146358 | | 9/1988 |
| JP | 1-235042 | | 9/1989 |
| JP | 1-260660 | | 10/1989 |
| JP | 3-273590 | | 12/1991 |
| JP | 4-123357 | | 4/1992 |
| JP | 4-362563 | | 12/1992 |
| JP | 5-28735 | * | 2/1993 |
| JP | 5-325378 | | 12/1993 |
| JP | 6-119702 | | 4/1994 |
| JP | 6-208785 | * | 7/1994 |
| JP | 8-287666 | | 11/1996 |
| JP | 11-297064 | * | 10/1999 |

* cited by examiner

SUPPORTING STRUCTURE OF FLOATING CHASSIS OF DISC APPARATUS

FIELD OF THE INVENTION

The present invention relates to a disc apparatus such as CD players, and more particularly to a floating chassis support mechanism suitable for a vehicle mount disc apparatus.

The present invention also relates to a vehicle mount disc reproduction apparatus in which a reproduction unit chassis is supported in a floating state by a main chassis with springs and dampers, and more particularly to a lock position of the reproduction unit chassis when a disk is unloaded or loaded.

DESCRIPTION OF THE RELATED ART

Figure 11:
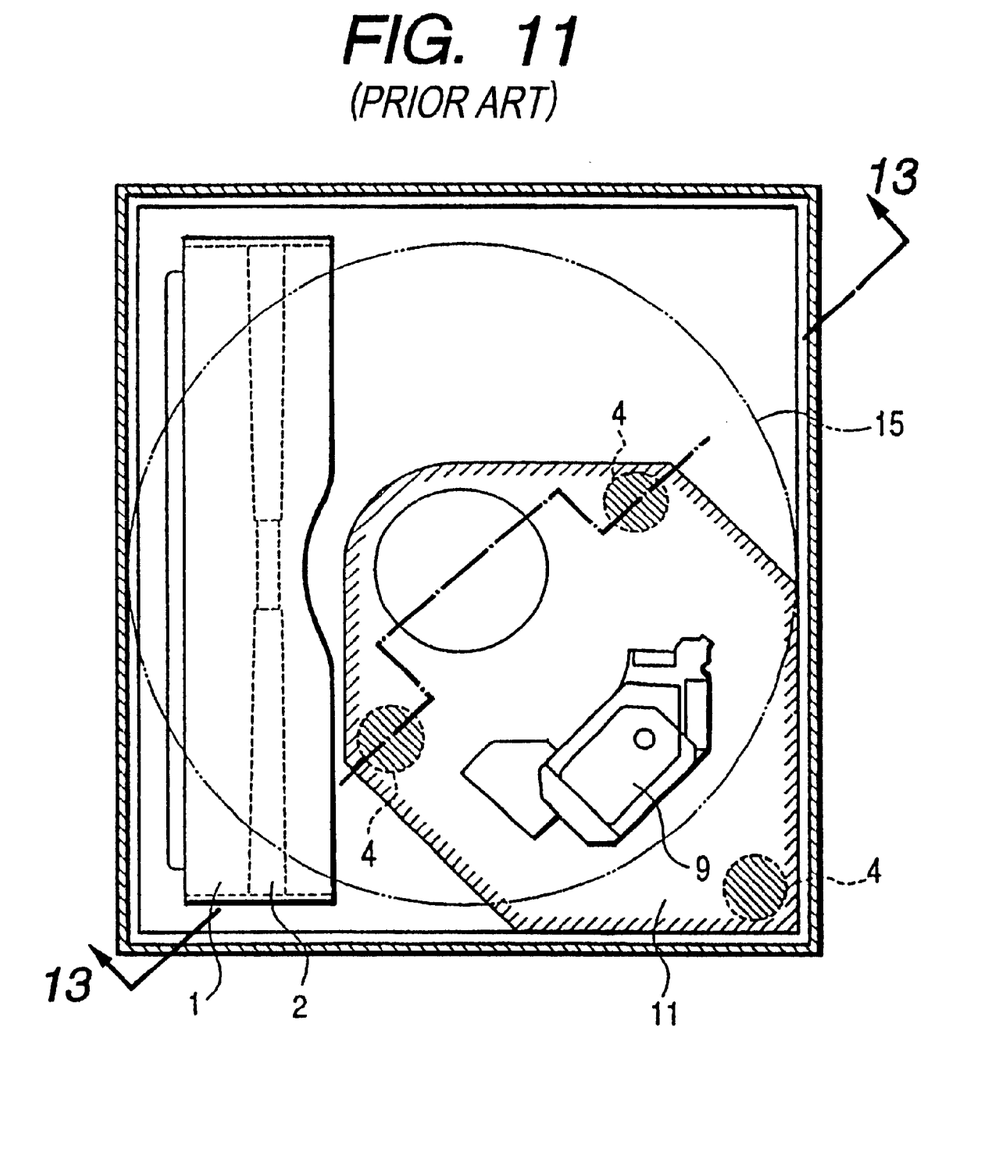
FIG. 11 is a plan view showing an example of a conventional floating chassis support mechanism for vehicle mount CD players.
Figure 12:
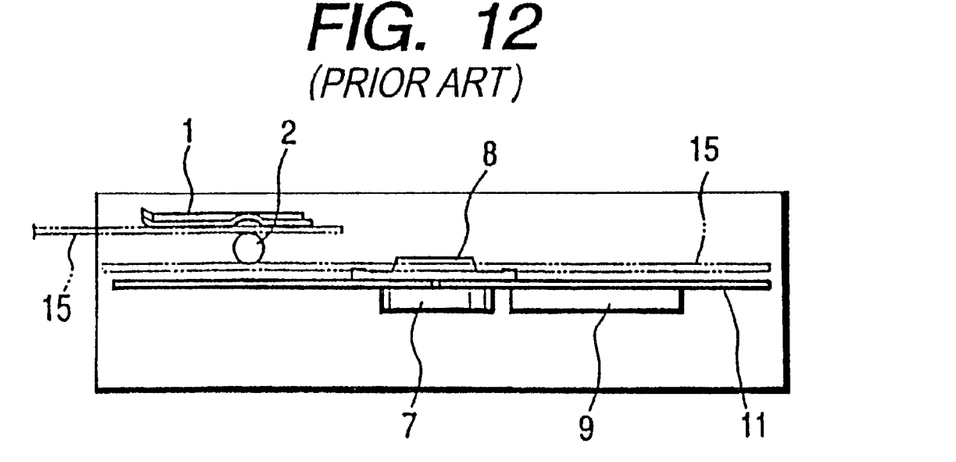
FIG. 12 is a side view showing the outline structure of the vehicle mount CD player.

An example of the structure of a conventional floating chassis support mechanism for vehicle mount CD players will be described with reference to FIGS. 11 to 13. A floating chassis 11 shown in FIGS. 11 and 12 supports thereon a disc motor 7, a pickup 9, and a pickup transport mechanism. The floating chassis is supported in a floating state by a main chassis (not shown) by dampers 4, 4, 4 and unrepresented coil springs during disk reproducing. At least one of the dampers 4, 4, 4 is disposed in a projection area of a disc during disk reproducing.

In loading/unloading a disc 15, the floating chassis 11 is locked to the main chassis by an unrepresented lock mechanism, and the disc 15 is squeezed between a disk guide 1 and a disc transport roller 2 and transported between a reproduction position and a disk insert port while the disk transport roller 2 rotates.

As the disc 15 is transported to the reproduction position, the transport roller 2 lowers and detaches from the disc 15 and the lock mechanism releases a lock of the floating chassis 11. Thereafter, the disc 15 is clamped between a turntable 8 fixedly connected to a rotary shaft of the disc motor 7 and an unrepresented clamper and then it is rotated. The optical pickup 9 is fed along a disc radial direction to reproduce information from the disc.

Figure 13:
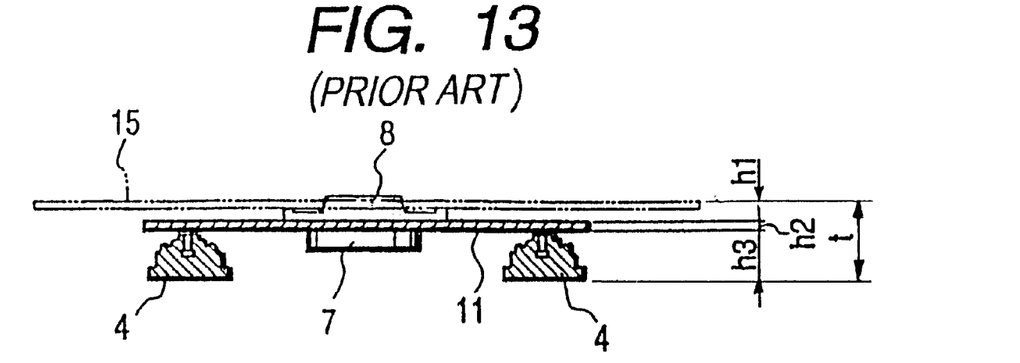
FIG. 13 is a cross sectional view taken along 13—13 in FIG. 11.

In the above-described conventional floating chassis support mechanism, since the damper 4 is disposed in the projection area of the disc 15, the depth from the upper surface of the disc 15 to the lower surface of the damper 4 is a total T=H1+H2+H3 as shown in FIG. 13, where H1 is a distance from the upper surface of the disc 15 to the upper surface of the floating chassis 11, H2 is a thickness of the floating chassis 11, and H3 is a thickness from the lower surface of the floating chassis 11 to the lower surface of the disc 15. Since the depth from the upper surface of the disc 15 to the lower surface of the damper 4 is large, the total height of the apparatus becomes large.

SUMMARY OF THE INVENTION

The invention has been made under the above-described circumstances. It is therefore an object of the invention to provide a floating chassis support mechanism for disc apparatuses capable of thinning the apparatus by reducing the necessary size from the upper surface of a loaded disc to the lower surface of a damper.

It is another object of the invention to provide a vehicle mount disc reproduction apparatus having the floating chassis support mechanism described above, capable of loading and unloading a disc with a short transport distance.

In a floating chassis support mechanism for a disc apparatus of this invention for supporting a floating chassis with springs and dampers vertically from the opposite side of a loaded disc, the dampers are disposed outside of a projection area of the disc, and an area of the floating chassis supported by the dampers is retracted toward the disk side more than a lower surface of the disc.

In the floating chassis support mechanism, the damper is fitted in a tubular portion of a main chassis and a damper pusher is fitted in the main chassis to push a bottom surface of the damper and mount the damper on the main chassis.

In the floating chassis support mechanism, the spring for supporting the floating chassis is fitted around an outer wall of the tubular portion of the main chassis, and engaged with a projection formed on the tubular portion.

In a vehicle mount disc reproduction apparatus with the floating chassis support mechanism of this invention having a reproduction unit chassis supported in a floating state by a main chassis with springs and dampers, the reproduction unit chassis is locked to the main chassis in a state shifted toward a disc insert port when a disk is loaded or unloaded.

DETAILED DESCRIPTION OF THE PREFERRED EMBODIMENTS

A floating chassis support mechanism for vehicle mount CD players according to an embodiment of the invention will be described with reference to FIGS. 1 to 7. A floating chassis 3 shown in FIGS. 1 and 2 supports thereon a disc motor 7, a pickup 9, and a pickup transport mechanism. The floating chassis is supported in a floating state by a main chassis 10 shown in FIGS. 10B to 10D by means of dampers 4, 4, 4 and coil springs 5 shown in FIGS. 5 to 7 during disk reproducing. All the dampers 4, 4, 4 are disposed outside of a projection area of a disc during disk reproducing.

In loading/unloading a disc 15, the floating chassis 3 is locked to the main chassis by a lock mechanism (25, 21a shown in FIGS. 10B to 10D), and the disc 15 is squeezed between a disk guide 1 and a disc transport roller 2 and transported between a reproduction position and a disk insert port while the disk transport roller 2 rotates.

Figure 10A:
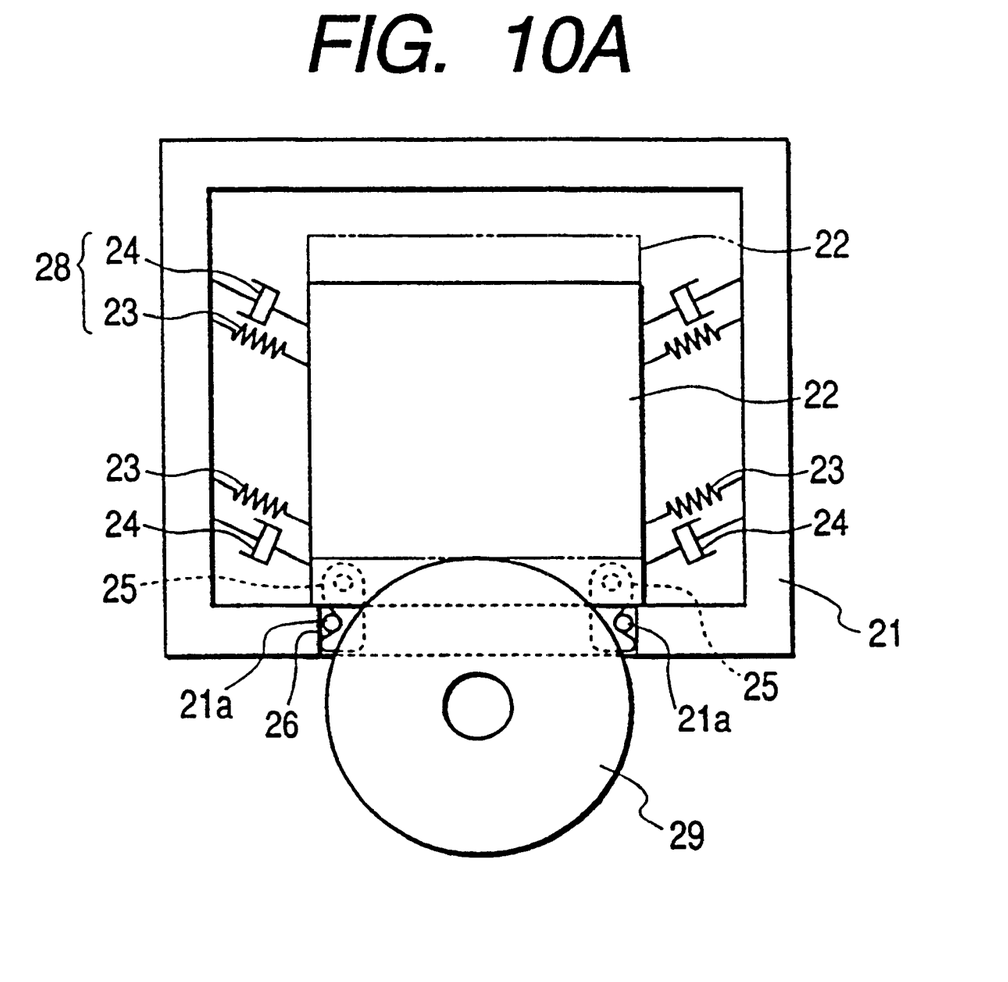
FIG. 10A is a plan view showing the outline structure of a vehicle mount disc reproduction apparatus according to an embodiment of the invention.
Figure 10B:
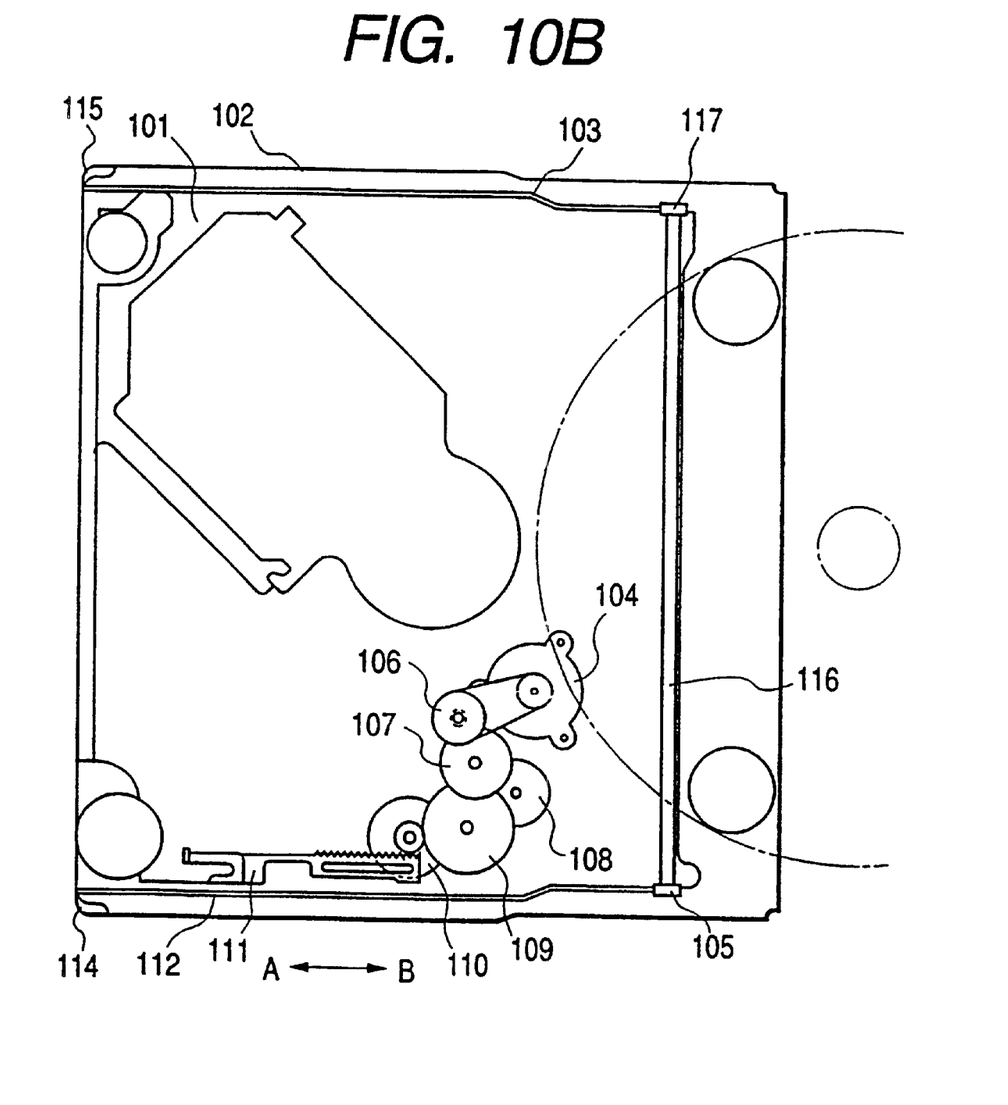
FIGS. 10B to 10D are diagrams illustrating the outline of the operation of a lock of a vehicle mount disc reproduction apparatus of the invention.
Figure 10C:
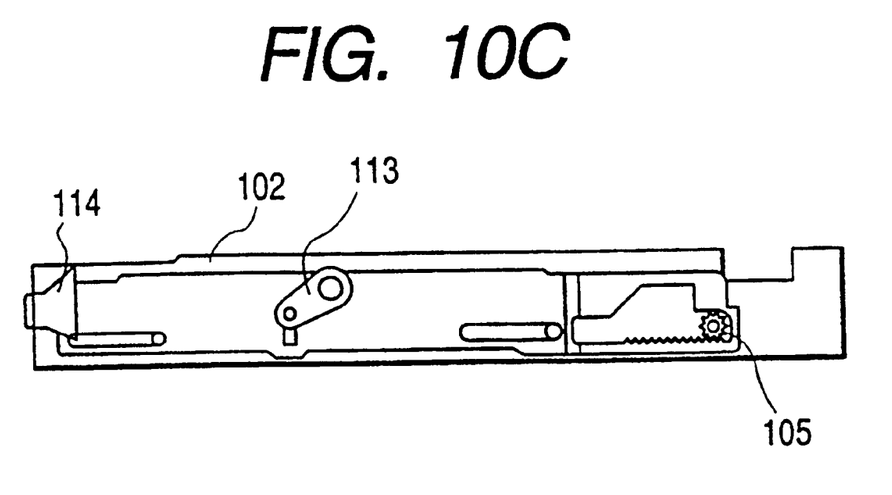
Figure 10D:
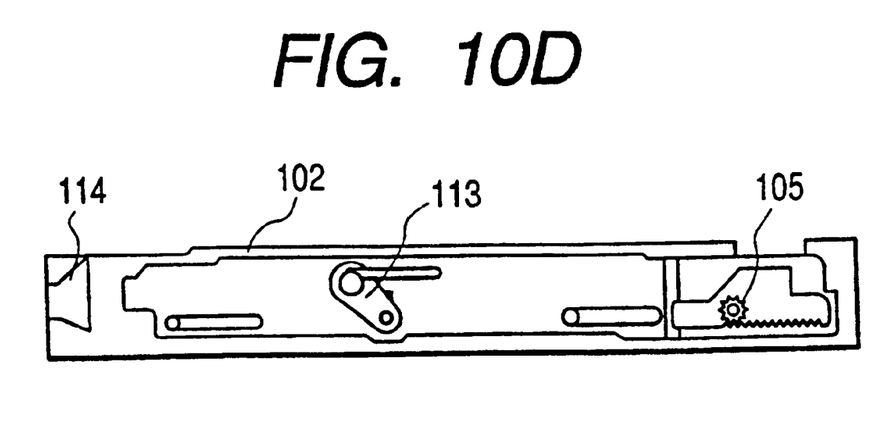

As the disc 15 is transported to the reproduction position, the transport roller 2 lowers and detaches from the disc 15 and the lock mechanism (25, 21a) releases a lock of the floating chassis 3. Thereafter, the disc 15 is clamped between a turntable 8 fixedly connected to a rotary shaft of the disc motor 7 and an unrepresented clamper and then it is rotated. The optical pickup 9 is fed along a disc radial direction to reproduce information from the disc.

Figure 4:
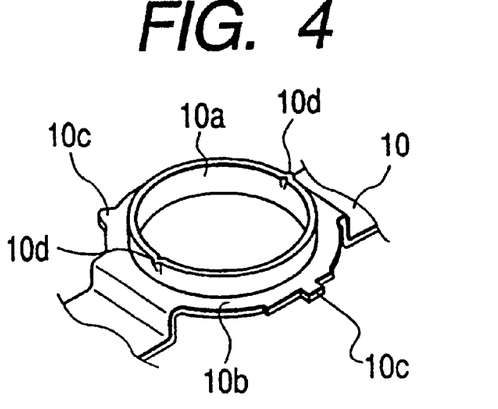
FIG. 4 is a perspective view of a mount for damper of a main chassis of the vehicle mount CD player.

FIG. 4 shows a mount of the damper 4, the mount being formed on the main chassis 10. As shown, the main chassis 10 is formed with a tubular portion 10a and a flange 10b integral with the tubular portion 10a. The tubular portion 10a is formed with projections 10d, 10d extending outward. The flange 10b is formed with three projections 10c, 10c, 10c. In FIG. 4, two projections 10c, 10c are shown.

Figure 7:
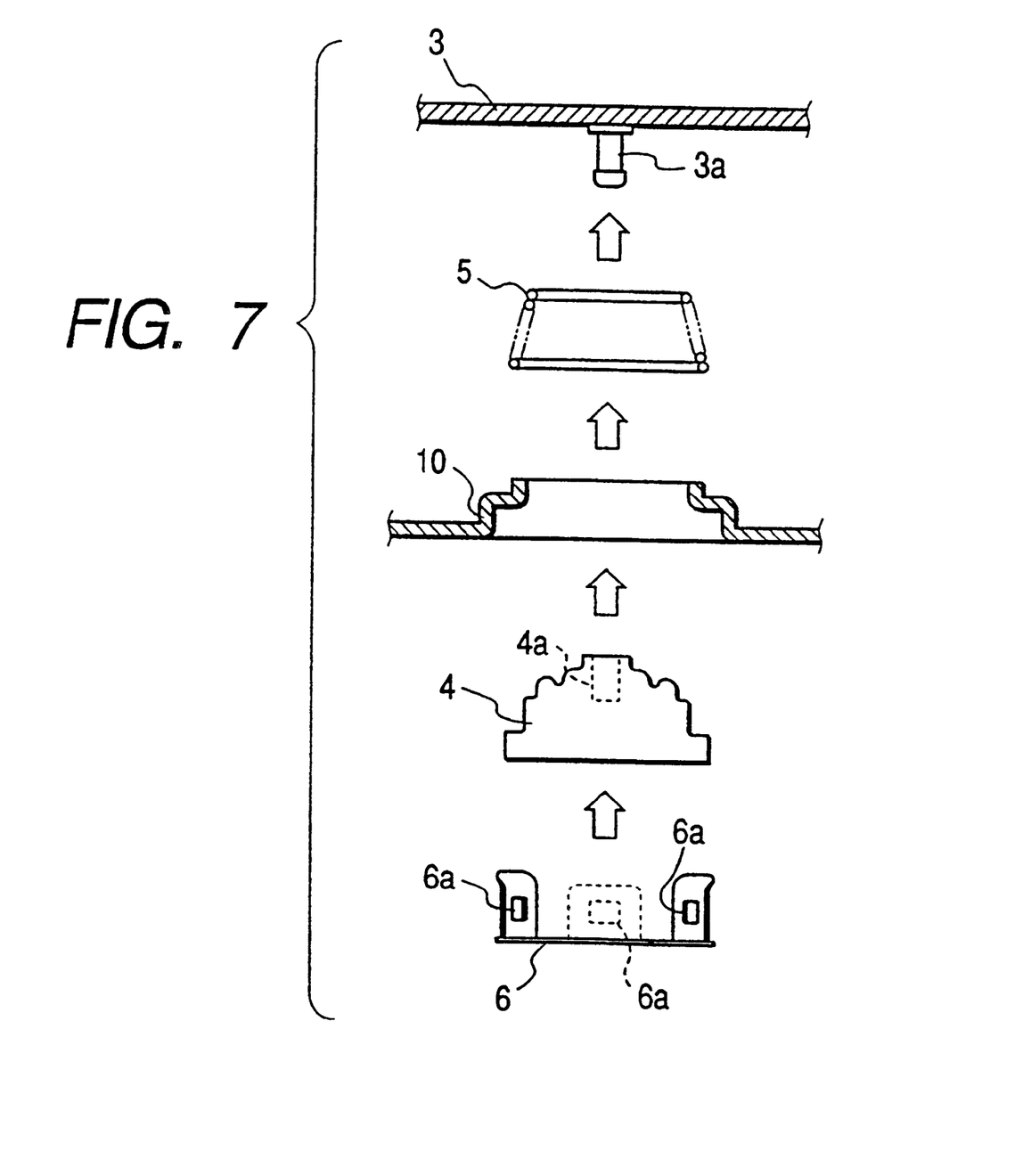
FIG. 7 is a broken view showing main parts of the vehicle mount CD player.

FIG. 7 illustrates a disassembled state of the damper 4 and the coil spring 5. The damper 4 shown in FIG. 7 is an envelope made of elastic material such as rubber in which viscous fluid is hermetically filled, and has a recess 4a formed in the head thereof. A shaft 3a mounted upright on the floating chassis 3 is inserted into this recess 4a. The damper 4 is inserted into the main chassis 10 and fixed thereto with a damper pusher 6 fitted in the main chassis 10.

Figure 5A:
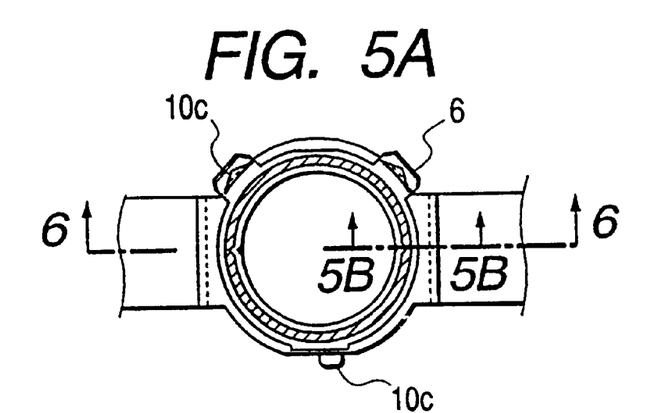
FIG. 5A is a plan view showing a mount for damper of a main chassis of the vehicle mount CD player.

The damper pusher 6 is made of a plate spring and has three tongues bent from the bottom thereof, the tongues being formed with holes 6a, 6a, 6a. As shown in FIG. 5A, these holes 6a, 6a, 6a engage with the projections 10c, 10c, 10c of the main chassis 10. The damper 4 can be mounted on the main chassis 10 with ease by inserting the damper 4 into the main chassis 10 and fitting the damper pusher 6 into the main chassis 10. Since the damper pusher 6 is made of a plate spring, the mount area for the damper 4 can be made thin. The damper pusher 6 may be made of a resin mold.

Figure 5B:
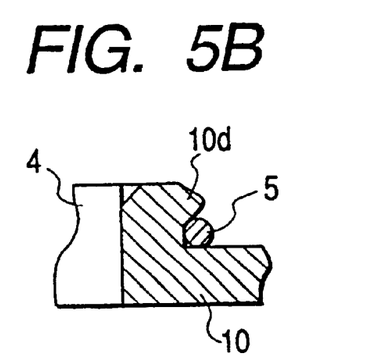
FIG. 5B is an enlarged cross sectional view taken along 5B—5B in FIG. 5A.
Figure 6:
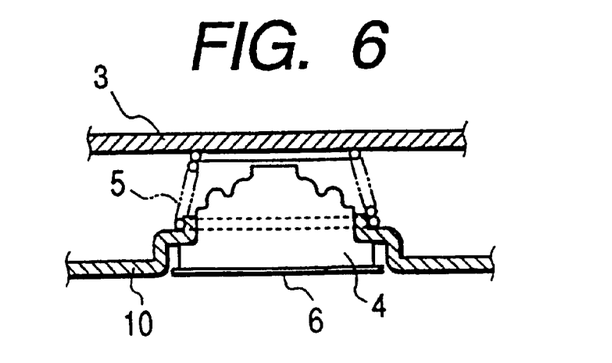
FIG. 6 is a cross sectional view taken along 6—6 in FIG. 5A.

The coil spring 5 is extended between the main chassis 10 and the floating chassis 3. As shown in FIG. 5B, the lower end of the coil spring 5 engages with a projection 10d of the main chassis 10. Since the coil spring 5 can be temporarily engaged with the projection 10d, an assembly work becomes easy. FIG. 6 shows a mount state of the damper 4 and coil spring 5.

Figure 1:
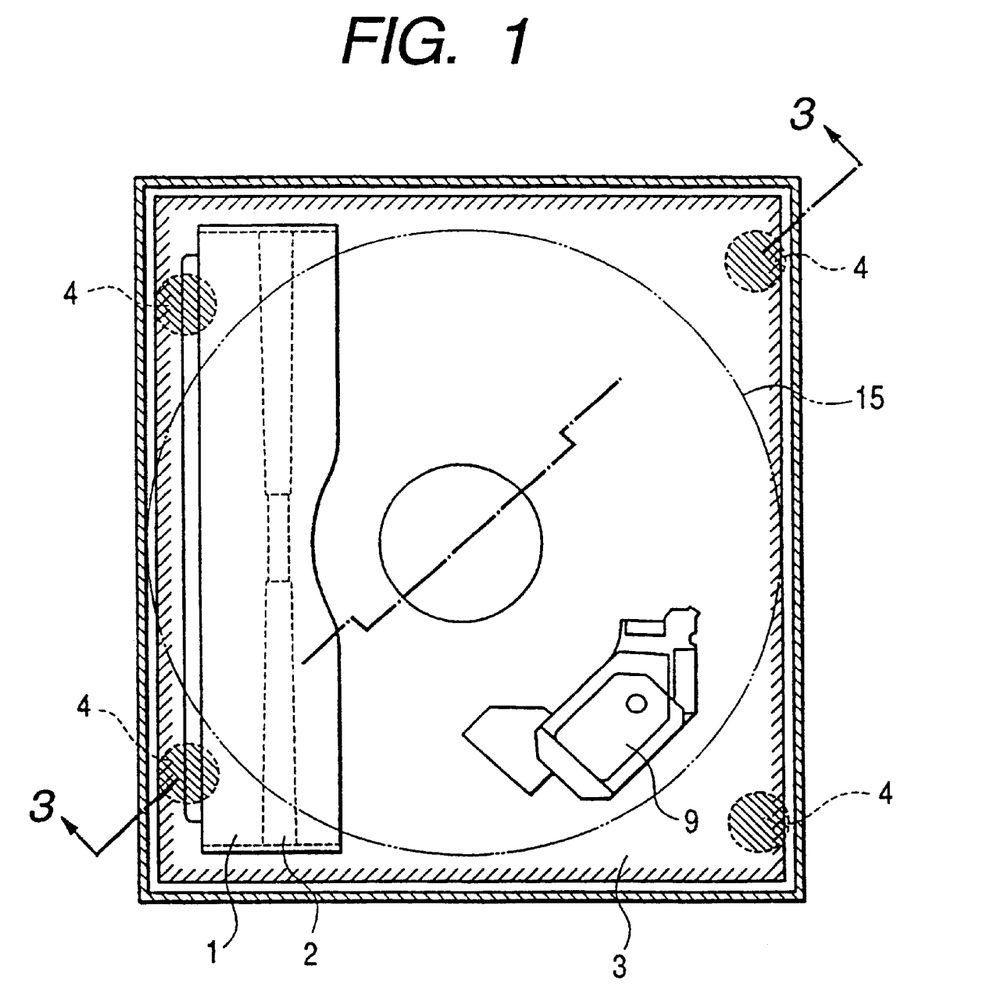
FIG. 1 is a plan view of a floating chassis support mechanism for vehicle mount CD players according to an embodiment of the invention.
Figure 2:
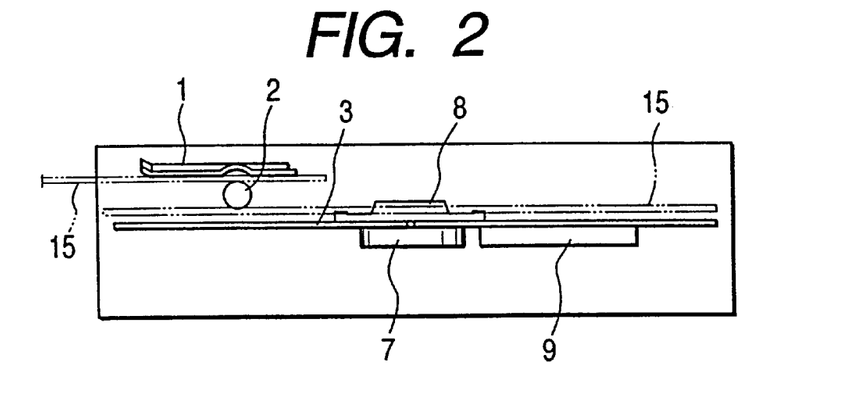
FIG. 2 is a side view showing the outline structure of a vehicle mount CD player.
Figure 3:
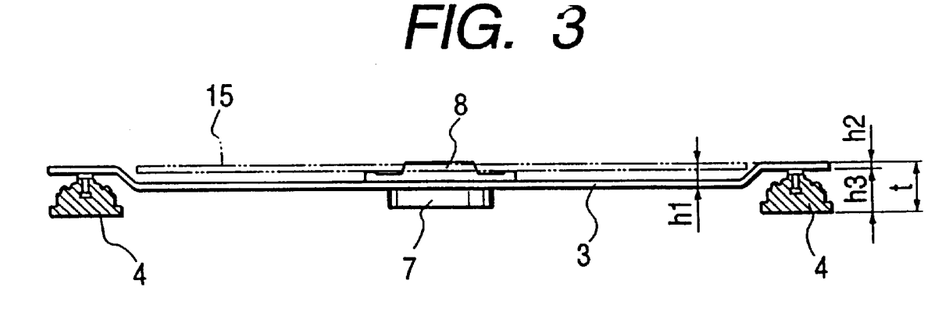
FIG. 3 is a cross sectional view taken along 3—3 in FIG. 1.

FIG. 3 shows the positional relationship between a loaded disc 15 and the dampers 4. Since the dampers 4 are disposed outside of the projection area of the disc 15, the area of the floating chassis 3 supported by the dampers 4 can be set higher than the other area. Namely, the area of the floating chassis 3 in the projection area of the disc 15 is set lower than the mount positions of the dampers 4. As shown in FIG. 3, the depth from the upper surface of the disc 15 to the lower surface of the damper 4 is a total t=h2+h3 where h2 is a thickness of the floating chassis 3 and h3 is a distance from the floating chassis 3 to the lower surface of the damper 4.

A distance h1 from the upper surface of the disc 15 to the upper surface of the floating chassis 3 corresponds to H1 of the conventional example shown in FIG. 13. The distance from the upper surface of the disc 15 to the lower surface of the damper 4 can be shortened by this distance h1. Accordingly, the apparatus can be thinned more than a conventional apparatus by the distance h1 shown in FIG. 3.

According to 1DIN of the German Industrial Standards, a vehicle mount acoustic apparatus is housed in a space having a width of 180 mm and a height of 50 mm. The height of a vehicle mount CD player embodying the present invention was possible to be set to 25 mm, irrespective of a use of a large stroke damper for vehicle mount apparatuses.

According to the floating chassis support mechanism for disc apparatuses of this invention, a vehicle mount apparatus using a large stroke damper can be thinned. An assembly work of a damper mechanism such as dampers and coil springs becomes easy.

Figure 8:
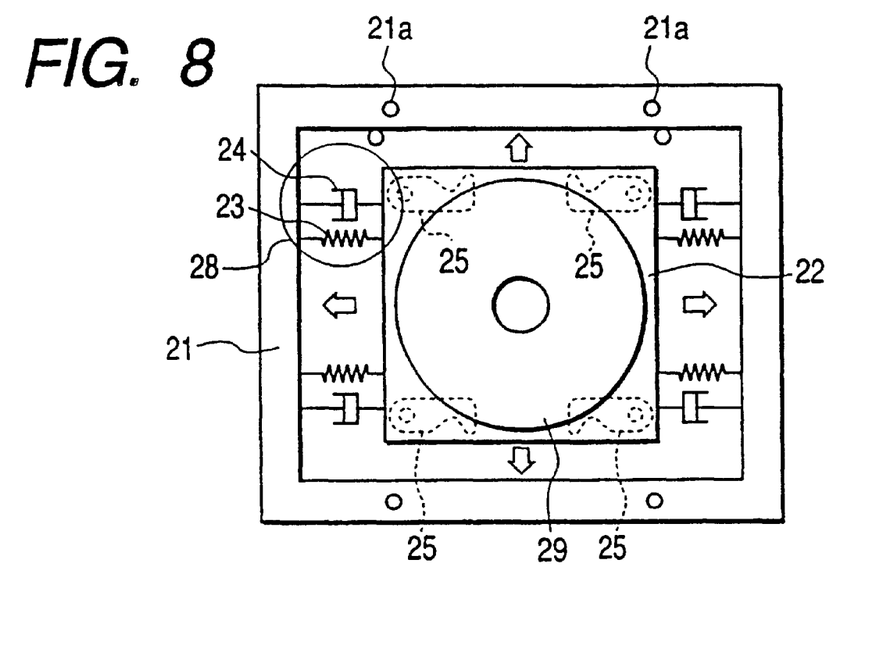
FIG. 8 is a plan view illustrating a reproduction state of a vehicle mount disc reproduction apparatus.

Of a disc reproduction apparatus with a floating chassis support mechanism of this invention, an example of a vehicle mount disc reproduction apparatus in which a reproduction unit chassis is supported in a floating state by a main chassis with springs and dampers, will be described with reference to FIGS. 8 and 9. FIG. 8 shows a reproduction state of a disc 29, and FIG. 9 shows a state that a disc 29 is loaded or unloaded.

Figure 9:
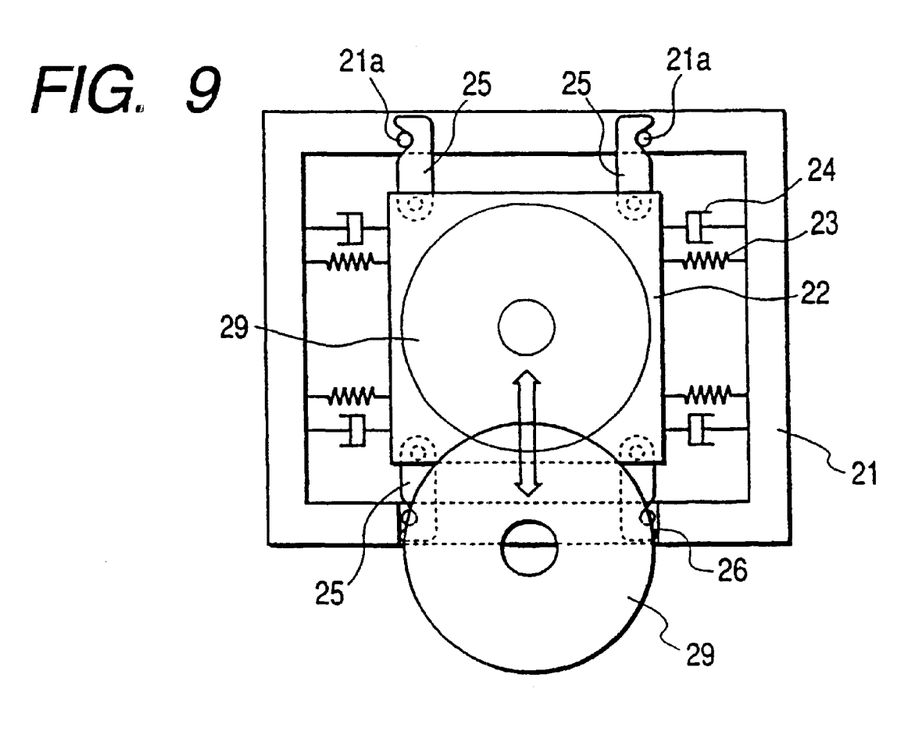
FIG. 9 is a plan view of the conventional vehicle mount disc reproduction apparatus when a disk is loaded or unloaded.

A reproduction unit chassis 22 shown in FIGS. 8 and 9 is used for supporting a pickup and a disc drive unit, and has a mechanism necessary for reproducing the disc 29. This reproduction unit chassis 22 is supported by a main chassis 21 with vibration damping mechanisms 28 each constituted of a damper 24 and a tension coil spring 23, in order not to transmit external vibrations to the reproduction unit chassis 22.

Since the reproduction unit chassis 22 is supported in a floating state by the vibration damper mechanisms 28, it moves in four directions indicated by arrows in FIG. 8, relative to the main chassis 21. In order to maintain a sufficient space of such a relative motion, the reproduction unit chassis 22 is disposed generally at the center of the space of the main chassis 21 in a natural state.

When the disc 29 is loaded or unloaded, the reproduction unit chassis 22 is locked to the main chassis 21 by rotating lock arms 25, 25, . . . and engaging them with shafts 21a, 21a, . . . mounted upright on the main chassis 21, in order to correctly align the disc 29 with a disc insert port 26, as shown in FIG. 9.

The lock arms 25, 25, . . . are rotatively supported by the reproduction unit chassis 22, and rotated by the lock mechanisms shown in FIGS. 10B to 10D. In a reproduction state, the lock arms 25, 25, . . . are at positions spaced from the shafts 21a, 21a, . . . as shown in FIG. 8. In a conventional vehicle mount disc reproduction apparatus, the reproduction unit chassis 22 is locked at the position same as that in the natural state during the reproduction.

In the above-described vehicle mount disc reproduction apparatus, the reproduction unit chassis 22 is locked at the position remote from the disc insert port 26 when the disc 29 is loaded or unloaded. Therefore, a motion distance of the disc 29 to the reproduction position becomes long, and the disc 29 is required to be transported to the deeper position of the apparatus. It is therefore difficult to load the disk 29 by holding only its peripheral areas without touching the recording surface thereof. This may cause the disk 29 to drop and be damaged or the recording surface may be touched and stained. Therefore, data read errors may occur during disc reproduction.

Furthermore, since the projection amount of the disc 29 from the apparatus is small, it is difficult to unload the disc 29 without touching the disc recording surface. This may cause the disk 29 to drop and be damaged or the recording surface may be touched and become dirty. Therefore, data read errors may occur during the next disc reproduction.

A vehicle mount disc reproduction apparatus improving the above points will be described with reference to FIG.10A. FIG. 10A shows the outline structure of a vehicle mount disc reproduction apparatus according to an embodiment of the invention. In FIG. 10A, a reproduction unit chassis 22 indicated by solid lines shows a loading state or an unloading state, and that indicated by two-dot chain lines shows a reproduction state. Similar to the above example, the reproduction unit chassis 22 is used for supporting a pickup and a disc drive unit, and has a mechanism necessary for reproducing the disc 29. This reproduction unit chassis 22 is supported by a main chassis 1 with vibration damping mechanisms 28 each constituted of a damper 24 and a tension coil spring 23, in order not to transmit external vibrations to the reproduction unit chassis 22.

The reproduction unit chassis 22 is disposed generally at the center of the space of the main chassis 21, as indicated by two-dot chain lines. When the disc 29 is loaded or unloaded, the reproduction unit chassis 22 is moved by the lock mechanisms shown in FIGS. 10B to 10D to a disc insert port, and locked at the position near the disc insert port, as indicated by solid lines. For this lock, two lock arms 25 and two shafts 21a similar to the example shown in FIGS. 8 and 9 are used.

An outline of the lock mechanism for the vehicle mount disc reproduction apparatus will be described with reference to FIGS. 10B to 10D. Mounted on a reproduction unit chassis 101 are a first slider 103, an actuator 104, pinions 105 and 117, a shift 116, first to fifth gears 106 to 110, a rack 111, a second slider 112, and an arm 113. The pinions 105 and 117 are fixed to opposite ends of the shaft 116 and rotate synchronously. A power from the actuator 104 is transmitted via the first to fifth gears 101 to 110 to the rack 111 to move the second slider 112 in a direction A. As the second slider 112 moves, the pinion 105 rotate and this rotation force is transmitted via the shaft 116 to the first slider 103 which in turn moves in the direction A synchronously with the second slider 112. As the first and second sliders 103 and 112 moves in the direction A and enters grooves of the first and second holders 114 and 115 mounted on a main chassis 102, the reproduction unit chassis 101 is pushed along a direction B and locked to the main chassis.

According to the vehicle mount disc reproduction apparatus of this invention, since the distance from the reproduction unit chassis and disc insert port is short when a disc is loaded, the disc can be loaded with ease without touching the disc recording surface. Therefore, the disc is prevented from being made dirty and data read errors are prevented.

Furthermore, since the distance from the reproduction unit chassis and disc insert port is short when a disc is unloaded, the disc can be unloaded with ease without touching the disc recording surface.

A different floating chassis support mechanism may be used for the vehicle mount disc reproduction apparatus shown in FIGS. 8 to 10D, independently of the floating chassis support mechanism shown in FIGS. 1 to 7.

What is claimed is:

1. A floating chassis support mechanism for an information reproduction apparatus for supporting a floating chassis mounted with a turntable with springs and dampers vertically from a lower surface of a disc loaded on the turntable, said dampers being disposed outside of a projection area of the disc, and an area of the floating chassis supported by said damper being set higher than the other area of the floating chassis, wherein an upper surface of said damper supported area of said floating chassis is set higher than the lower surface of the disc.

2. A floating chassis support mechanism according to claim 1, wherein the damper is fitted in a tubular portion (10a) of a main chassis (10) and a damper pusher (6) is fitted in the main chassis to push a bottom surface of the damper and mounts the damper on the main chassis.

3. A floating chassis support mechanism according to claim 2, wherein the spring for supporting the floating chassis is fitted around an outer wall of the tubular portion of the main chassis, and engaged with a projection (10d) formed on the tubular portion.

4. A floating chassis support mechanism according to claim 2, wherein the damper pusher is a plate spring.

5. A floating chassis support mechanism according to claim 2, wherein said damper pusher is a molded product made of a resin material.

6. A floating chassis support mechanism according to claim 2, wherein the damper pusher has tongues (6a) with holes into which projections (10c) mounted on the main chassis are inserted to fix the damper pusher to the main chassis.

7. A floating chassis support mechanism according to claim 2, wherein the tubular portion has a height covering generally a half height of the damper from the bottom, the remaining height of the damper projecting out of the tubular portion.

8. A floating chassis support mechanism according to claim 1, wherein the damper is made of an elastic envelope in which a viscous fluid is hermetically filled.

9. A floating chassis support mechanism according to claim 8, wherein the spring surrounds the damper at a remaining height.

10. A floating chassis support mechanism according to claim 1, wherein the damper has a recess (4a) formed in an upper region thereof, and a shaft (3a) mounted on the floating chassis (3) is inserted into the recess to mount the damper on the floating chassis.

11. A floating chassis support mechanism according to claim 1, wherein the spring is a coil spring fitted around the damper.

12. A floating chassis support mechanism according to claim 1, wherein a thickness of the mechanism corresponds to a depth from an upper surface of the disc to a lower surface of the damper which is a sum of a thickness (h2) of the floating chassis and a distance (h3) from a lower surface of the floating chassis to the lower surface of the damper.

* * * * *